(12) United States Patent
Dziuk et al.

(10) Patent No.: US 10,936,652 B2
(45) Date of Patent: Mar. 2, 2021

(54) PLAYBACK OF AUDIO CONTENT ALONG WITH ASSOCIATED NON-STATIC MEDIA CONTENT

(71) Applicant: SPOTIFY AB, Stockholm (SE)

(72) Inventors: Dariusz Dziuk, Stockholm (SE); Tetiana Karagodova, Stockholm (SE); Andrea Nicole Doroja Limjoco, Stockholm (SE); Roy Menahem Marmelstein, Stockholm (SE)

(73) Assignee: Spotify AB, Stockholm (SE)

( * ) Notice: Subject to any disclaimer, the term of this patent is extended or adjusted under 35 U.S.C. 154(b) by 91 days.

(21) Appl. No.: 16/162,156

(22) Filed: Oct. 16, 2018

(65) Prior Publication Data

US 2019/0114361 A1 Apr. 18, 2019

(30) Foreign Application Priority Data

Oct. 17, 2017 (EP) .................................... 17196945

(51) Int. Cl.
| | |
|---|---|
| *G06F 16/683* | (2019.01) |
| *H04N 21/4722* | (2011.01) |
| *H04N 21/431* | (2011.01) |
| *G06F 16/48* | (2019.01) |
| *G06F 16/583* | (2019.01) |
| *G06F 16/783* | (2019.01) |
| *G06F 16/43* | (2019.01) |

(52) U.S. Cl.
CPC ............ *G06F 16/683* (2019.01); *G06F 16/43* (2019.01); *G06F 16/48* (2019.01); *G06F 16/583* (2019.01); *G06F 16/7834* (2019.01); *H04N 21/4316* (2013.01); *H04N 21/4722* (2013.01)

(58) Field of Classification Search
None
See application file for complete search history.

(56) References Cited

U.S. PATENT DOCUMENTS

| | | | |
|---|---|---|---|
| 2009/0006191 A1* | 1/2009 | Arankalle | G06Q 30/02 705/14.71 |
| 2016/0173960 A1* | 6/2016 | Snibbe | G06F 16/13 386/285 |
| 2016/0378269 A1 | 12/2016 | Conway et al. | |

OTHER PUBLICATIONS

Spotify AB, Extended European Search Report, EP17196945.4, dated Jan. 30, 2018, 12 pgs.

(Continued)

*Primary Examiner* — Tuan S Nguyen
(74) *Attorney, Agent, or Firm* — Morgan, Lewis & Bockius LLP

(57) ABSTRACT

This disclosure concerns the provision of media, and more particularly streaming of media. In particular, one aspect herein relates to a method performed by a server system of streaming an audio content item to an electronic device. In response to receiving a request message from the electronic device, a selected audio content item is retrieved from a first storage. Descriptive metadata including an origin-ID associated with the retrieved audio content item is determined. A second storage is browsed utilizing said metadata including the origin-ID to locate non-static media content item(s) associated with the origin-ID. In response to finding a non-static media content item associated with the origin ID, the selected audio content item is sent along with the located non-static media content item to the electronic device for simultaneous presentation of the audio content item and the located non-static media content item.

12 Claims, 8 Drawing Sheets

(56) References Cited

OTHER PUBLICATIONS

Spotify AB, Communication Pursuant to Article 94(3), EP17196945.4, dated Aug. 9, 2018, 6 pgs.
Spotify AB, Summons to Attend Oral Proceedings Pursuant to Rule 115(1), EP 17196945.4, dated Feb. 28, 2019, 9 pgs.

* cited by examiner

PLAYBACK OF AUDIO CONTENT ALONG WITH ASSOCIATED NON-STATIC MEDIA CONTENT

RELATED APPLICATIONS

This application claims priority to European Patent Application No. EP17196945, filed Oct. 17, 2017, entitled, "Playback of Audio Content Along with Associated Non-Static Media Content," which is hereby incorporated by reference in its entirety.

TECHNICAL FIELD

The present disclosure generally relates to the provision of media, and more particularly to the streaming of media. In particular, the embodiments described herein relate to methods and computer server systems for streaming an audio content item to an electronic device, whereby a selected audio content item can be transmitted along with a non-static media content item to the electronic device. Furthermore, embodiments described herein relate to corresponding methods and electronic devices that can present the selected audio content item as well as the non-static media content item simultaneously. Corresponding computer program and carriers are also presented herein.

BACKGROUND

As computer technology has improved, the digital media industry has evolved greatly in recent years. Users are able to use electronic devices such as mobile communication devices (e.g., cellular telephones, smartphones, tablet computers, etc.) to consume media content (e.g., music, videos and other forms of media content). For instance, users can listen to audio content (e.g., music) and/or watch video content (e.g., movies, television (TV) broadcasts, etc.) on a variety of electronic devices.

At the same time, advances in network technology have increased the speed and reliability with which information can be transmitted over computer networks. It is therefore possible for users to stream media content over computer networks as needed, or on demand, rather than transmitting a complete file in physical media (such as CD or DVD, or downloading the entire file) before consuming the media content.

In the existing art, audio content items are typically associated with static media content. For example, an audio content item in the form of a music content item (e.g., a music file) is typically linked or coupled to pre-defined static image content (e.g., a rectangular cover art associated with a music album). Some users may perceive this as being unnecessarily limiting to the user-friendliness during the users' consumption of audio content.

SUMMARY

It is in view of the above considerations and others that the various embodiments disclosed herein have been made.

It is a general object of the embodiments described herein to enable a novel user experience when consuming streamed media content.

This general object has been addressed by the appended independent claims. Advantageous embodiments are defined in the appended dependent claims.

According to a first aspect, this disclosure presents a method of streaming an audio content item to an electronic device. The audio content item may be associated with, or otherwise include, audio content for playback by the electronic device. The method is advantageously, but not necessarily, performed by a computer server system comprising one or several computers.

A request message is received from an electronic device. The request message includes an instruction requesting the computer server system to return a selected audio content item to the electronic device. In response to receiving the request message, the selected audio content item is retrieved from a first storage. Furthermore, descriptive metadata including an origin identification (ID) associated with the retrieved audio content item is determined. Still further, a second storage is browsed utilizing said metadata including the origin ID. This is done in order to locate a non-static media content item associated with the origin ID. In response to finding non-static media content item associated with the origin ID, the method additionally comprises transmitting the selected audio content item along with the located non-static media content item to the electronic device for subsequent simultaneous presentation of the audio content item as well as the located non-static media content item by the electronic device.

As used herein, the expression non-static is used to mean non-permanent. In other words, the expression non-static can also be used to mean changing, developing or shifting. A non-static media content item is therefore to be understood as a media content item associated with, or otherwise including, media content that is non-permanent and, accordingly, can change, develop or shift over time. In other words, non-static media content item is therefore dynamic.

In some embodiments, the origin ID may include one or more of the following: a track ID, an artist ID, a playlist ID.

In some embodiments, the non-static media content item includes a visual media content item. The visual media content item is thus associated with, or otherwise include, media content that is visual to a user of the electronic device when said visual media content is presented (or otherwise played) by the electronic device.

In advantageous embodiments, the non-static media content item comprises a video content item. The video media content item is thus associated with, or otherwise include, video content.

In one embodiment, the video content item may comprise a video canvas content item. In other words, video content may incorporate or otherwise embed video canvas content. As used herein, canvas content is generally content that is configured to incorporate a variety of visual effects to the video content being played.

Additionally, or alternatively, the non-static media content item includes content items including one or more of the following: dynamic text, dynamic image (e.g., a dynamic picture), etc. To this end, and throughout this disclosure, the expression 'dynamic' is generally used to mean changing or developing (over time). In other words, dynamic text may include text that undergoes a continuous change during presentation. Likewise, a dynamic image may include an image that undergoes a continuous change during presentation. In one embodiment, the dynamic text and/or the dynamic image may comprise a canvas content item. In other words, the dynamic text and/or the dynamic image may incorporate or otherwise embed the canvas content. Again, the canvas content is, generally speaking, content that is configured to incorporate a variety of visual effects to the dynamic text/dynamic image being presented.

In some embodiments, the method may additionally comprise receiving a request message from an electronic device.

This request message includes an instruction requesting the computer server system to change, or otherwise modify, a non-static media content item associated with a selected origin ID; and in response thereto changing, or otherwise modifying, the non-static media content item associated with the selected origin ID accordingly.

In some embodiments, the earlier-mentioned first storage is separate and distinct (i.e., different) from the earlier-mentioned second storage.

According to a second aspect, this disclosure presents a computer server system for streaming an audio content item to an electronic device. As described earlier, the audio content item may be associated with, or otherwise include, audio content for playback by the electronic device.

The computer server system comprises at least one communications interface for transmission and reception of messages; at least one processor; and memory comprising instructions executable by the at least one processor whereby the computer server system is operative to: i) receive a request message from an electronic device via the at least one communications interface, said request message including an instruction requesting the computer server system to return a selected audio content item to the electronic device; ii) in response to receiving said request message, retrieve said selected audio content item from a first storage; and iii) determine descriptive metadata including an origin ID associated with said retrieved audio content item; iv) browse a second storage, utilizing said metadata including the origin ID, to locate a non-static media content item associated with the origin ID; and in response to finding non-static media content item associated with the origin ID further: v) transmit, via the at least one communications interface, the selected audio content item along with the located non-static media content item to the electronic device for subsequent simultaneous presentation of the audio content item as well as the located non-static media content item by the electronic device.

As mentioned earlier, the expression non-static is used to mean non-permanent. In other words, the expression non-static can also be used to mean changing, developing or shifting. A non-static media content item is therefore to be understood as a media content item associated with, or otherwise including, media content that is non-permanent and, accordingly, can change or shift over time. In other words, non-static media content item is therefore dynamic.

The above-mentioned origin ID may include one or more of the following: a track ID, an artist ID, a playlist ID.

In advantageous embodiments, the non-static media content item comprises a video content item. The video media content item is thus associated with, or otherwise include, video content. In one embodiment, the video content item may comprise a video canvas content item. In other words, video content may comprise video canvas content. As described earlier, canvas content is generally content that is configured to incorporate a variety of visual effects to the video content being played.

Additionally, or alternatively, the non-static media content item includes content items including one or more of the following: dynamic text, dynamic image (e.g., a dynamic picture). Again, dynamic text may include text that undergoes a continuous change during presentation. Likewise, a dynamic image may include an image that undergoes a continuous change during presentation.

In some embodiments, the memory may additionally comprises instructions executable by the at least one processor whereby the computer server system is further operative to: receive, via the at least one communications interface, a request message from an electronic device, said request message including an instruction requesting the computer server system to change, or otherwise modify, a non-static media content item associated with a selected origin ID; and in response thereto change, or otherwise modify, the non-static media content item associated with the selected origin ID accordingly.

In advantageous embodiments, the first storage is separate and distinct (i.e., different) from the second storage.

According to a third aspect, this disclosure presents computer program comprising instructions which, when executed on at least one processor, cause the at least one processor to carry out the method according to the first aspect.

Also, a carrier comprising the computer program according to the third aspect may be provided. The carrier may, for example, be an electronic signal, an optical signal, a radio signal or computer-readable storage medium.

According to a fourth aspect, this disclosure presents a method of streaming an audio content item, wherein the method is performed by an electronic device, e.g. a mobile communication device (e.g., a cellular telephone, a smartphone, a tablet computer, or the like).

A request message is transmitted to a computer server system. This request message includes an instruction requesting the computer server system to return a selected audio content item to the electronic device. Furthermore, the selected audio content item is received along with a located non-static media content from the computer server system. In response thereto, the audio content item as well as the located non-static media content are presented simultaneously, i.e. substantially at the same time.

In some embodiments, the method may additionally or alternatively comprise transmitting a request message to the computer server system, wherein this request message includes an instruction requesting the computer server system to change, or otherwise modify, a non-static media content item associated with a selected origin ID.

According to a fifth aspect, this disclosure presents an electronic device for streaming an audio content item. The electronic device may be a mobile communication device (e.g., a cellular telephone, a smartphone, a tablet computer, or the like). The electronic device comprises a user interface; a communications interface for transmission and reception of messages; at least one processor; and memory comprising instructions executable by the at least one processor whereby the electronic device is operative to: i) transmit, via the communications interface, a request message to a computer server system, said request message including an instruction requesting the computer server system to return a selected audio content item to the electronic device; and ii) receive, via the communications interface, the selected audio content item along with a located non-static media content from the computer server system; and iii) in response thereto simultaneously present the audio content item as well as the located non-static media content by means of the user interface.

In some embodiments, the memory may additionally or alternatively comprise instructions executable by the at least one processor whereby the electronic device is operative to transmit, via the communications interface, a request message to the computer server system, wherein this request message includes an instruction requesting the computer server system to change, or otherwise modify, a non-static media content item associated with a selected origin ID.

According to a sixth aspect, this disclosure presents a method of streaming an audio content item in a client-server environment. The audio content item may be associated with, or otherwise include, audio content for playback by an electronic device.

An electronic device transmits a request message to a computer server system. This request message includes an instruction requesting the computer server system to return a selected audio content item to the electronic device. The computer server system receives the request message from the electronic device. In response to receiving the request message, the computer server system retrieves said selected audio content item from a first storage. The computer server system further determines descriptive metadata including an origin identification (ID) associated with said retrieved audio content item. Furthermore, the computer server system also browses a second storage (which is advantageously separate and distinct from the first storage) utilizing said metadata including the origin ID, to locate a non-static media content item associated with the origin ID. In response to finding a non-static media content item associated with the origin ID in the second storage, the computer server system further transmits the selected audio content item along with the located non-static media content item to the electronic device for subsequent simultaneous presentation of the audio content item as well as the located non-static media content item by the electronic device. The electronic device receives the selected audio content item along with the located non-static media content from the computer server system. In response thereto the electronic device presents the audio content item as well as the located non-static media content simultaneously, e.g. substantially at the same time.

Various aspects and embodiments described herein enable a novel user experience when consuming streamed media content.

In particular, various aspects and embodiments described herein provide a novel user experience when consuming streamed audio content at an electronic device, such as a mobile communication device. The audio content items and the non-static media items are separate and distinct from each other. This provides for a flexible solution. Whereas in the existing art an audio content item e.g. in the form of a music content item (e.g., a music file) is typically linked or coupled to pre-defined static image content (e.g., a rectangular cover art associated with a music album), the separation between the audio content item and the non-static media content item allows for a more flexible solution where a certain audio content item may be associated with several different non-static media content items.

In some embodiments, the first storage and the second storage are separate storages. This may allow for an increasingly effective separation of the audio content items and the non-static media content items, respectively. During streaming from the computer server system to the electronic device, audio content items and non-static media content items are consequently retrieved from different storages. This contributes to achieving a user experience with little or no interruptions in the simultaneous playback and presentation of the selected audio content item and its associated non-static media content item. Having separate storages may be particularly advantageous in scenarios where a non-static media content item comprises a video content item.

In some embodiments, the non-static media content comprises a video content item. At the electronic device, it is possible to pre-fetch segments of a video content item. Having separate storages facilitates simultaneous transmission of the audio content at the one hand and the video content item on the other hand, since the video content item can be segmented more easily and, hence, the electronic device will be capable of pre-fetching the video content item during the streaming. At the electronic device, this allows for a user experience with no or little interruptions during the simultaneous playback/presentation of a selected audio content item and its associated video content item.

In some embodiments, it is made possible to change, or otherwise modify, a non-static media content item associated with a selected origin ID. This allows for an increasingly flexible solution for the distribution of media content. For example, users of electronic devices can control the non-static media content items at anytime and anywhere. This, in turn, may enable users such as artists to individually control non-static media content items associated with their music. In other words, this opens up for a completely new way for artists to control the distribution of their own artistic creations. In a sense, this will also contribute to artist being able to connect more easily to their respective fans.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

Figure 1:
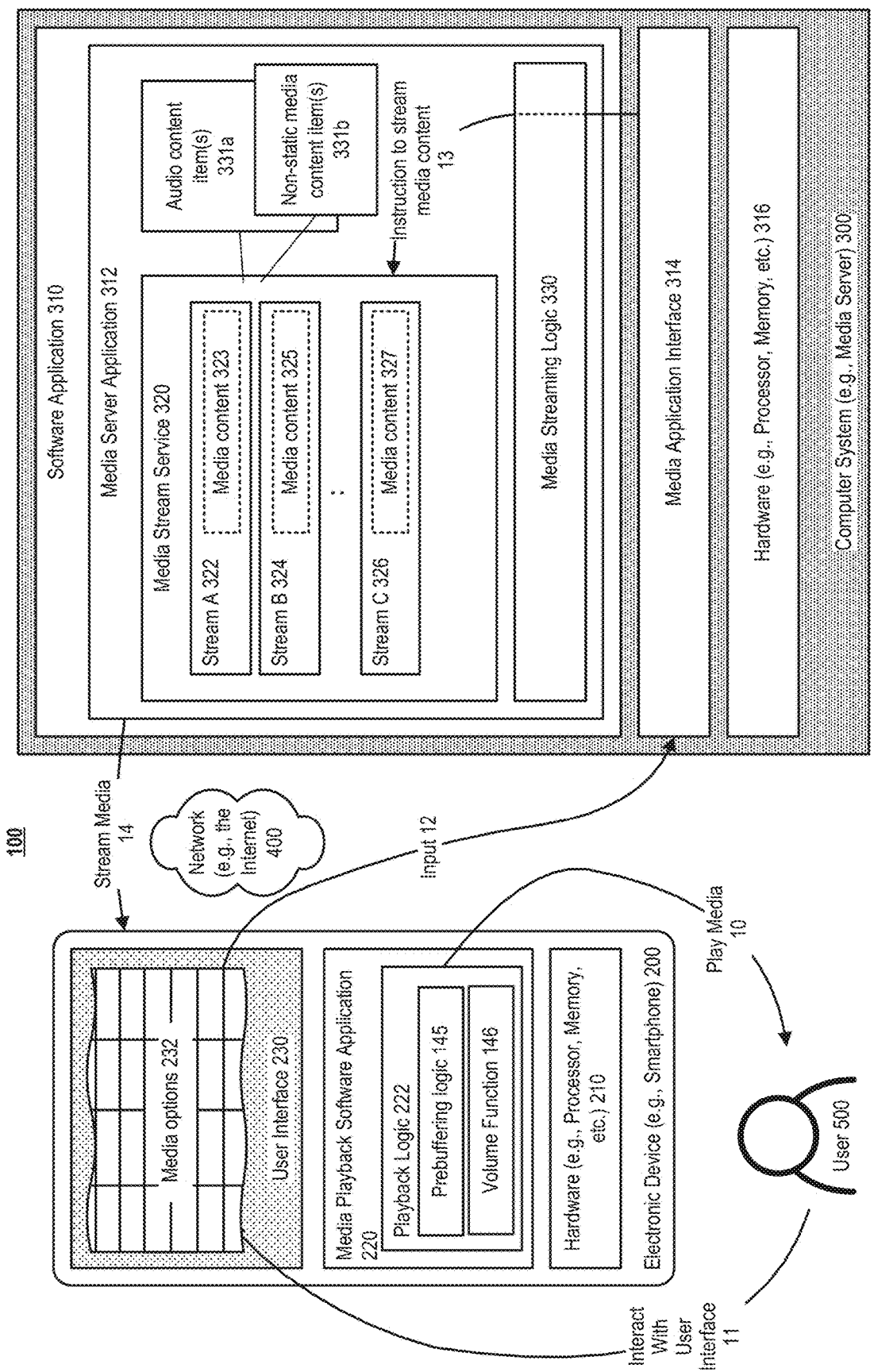
FIG. 1 illustrates a client-server environment for playback of streamed media content.

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier herein, some existing solutions for streaming of media content may be inadequate. It is a general object of the embodiments described herein to enable a novel user experience when consuming streamed media content. More particularly, some aspects and embodiments disclosed herein therefore address how to allow users of electronic devices to consume audio content in an increasingly user-friendly and/or enjoyable manner.

To address this, in accordance with an aspect, described herein are a method of streaming an audio content item in a client-server environment. The audio content item may be associated with, or otherwise include, audio content for playback by an electronic device. An electronic device transmits a request message to a computer server system. This request message includes an instruction requesting the computer server system to return a selected audio content item to the electronic device. The computer server system receives the request message from the electronic device. In response to receiving the request message, the computer server system retrieves said selected audio content item from a first storage. The computer server system further determines descriptive metadata including an origin identification (ID) associated with said retrieved audio content item. Furthermore, the computer server system browses a second storage (which is advantageously separate and distinct from the first storage) utilizing said metadata including the origin ID, to locate a non-static media content item (e.g., a video content item) associated with the origin ID. In response to a finding non-static media content item associated with the origin ID in the second storage, the computer server system further transmits the selected audio content item along with the located non-static media content item to the electronic device for subsequent simultaneous playback/presentation of the audio content item as well as the located non-static media content item by the electronic device. The electronic device receives the selected audio content item along with the located non-static media content from the computer server system. In response thereto, the electronic device presents the audio content item as well as the located non-static media content simultaneously, i.e. at the same time or substantially at the same time.

By providing playback of a selected audio content item and simultaneous presentation of an associated non-static media content item, it is made possible to provide a novel user experience. Some users may perceive this novel user experience as an enhanced and/or an increasingly user-friendly user experience. For example, some users who consume media (e.g., music streaming) will perceive this as particularly enjoyable since the visual appearance of the displayable non-static media content associated with a certain piece of music (or a certain album of songs) can change or develop during the playback of the same piece of music (or album of songs).

Reference is now made to the figures, where FIG. 1 illustrates an example environment where embodiments of the present invention may be applied. The description in connection with FIG. 1 is intended to introduce a possible environment where embodiments of the present invention may be reduced to practice.

With continued reference to FIG. 1, an example client-server environment 100 for playback of media content will therefore now be described in further detail. The client-server environment 100 may include an electronic device 200 and a computer server system 300, e.g. operating as a media server system. The computer server system 300 may comprise one single computer or several computers. The electronic device 200 may be communicatively connectable to the computer server system 300 via a network 400, such as the Internet. As can be seen in FIG. 1, only a single electronic device 200 and a single computer server system 300 are shown. However, the computer server system 300 may support the simultaneous use of multiple electronic devices, and/or the electronic device 200 can simultaneously access media content at multiple computer server systems.

As shown in FIG. 1, the electronic device 200 may be used for the playback of audio content such as music, which is provided by the computer server system 300. The electronic device 200 may be a mobile communication device (e.g. a mobile telephone such as a smartphone). Alternatively, the electronic device 200 may be a tablet computer.

In yet other embodiments, the electronic device 200 may be any other electronic device capable of playback of media content such as, for example, one of the electronic devices of the following group: a personal computer, a laptop, and a mobile electronic device (e.g. a handheld entertainment device, a digital media player, or other media device).

The electronic device 200 may include one or several physical computer resources, or hardware resources 210. The hardware resources 210 may e.g. include one or several processors (or, processing circuitry), a communications interface (or, communication circuitry) and one or several memories.

Likewise, the computer server system 300 may include one or several physical computer resources, or hardware resources 316. The hardware resources 316 may likewise include e.g. one or several processors (or, processing circuitry), a communications interface (or, communication circuitry) and one or several memories.

The computer server system 300 may include an operating system or other processing system which supports execution of a software application 310, including a media server application 312 which may be used, for example, to stream media content. A media stream service 320 may be used to buffer media content, for streaming to one or more media streams 322, 324, 326. A media application interface 314 may receive requests from electronic devices 200 or other systems, to retrieve media content 331 from the computer system 300.

Media content 331, or media content items, may be provided, for example, within a storage such as a memory (e.g., including a database), or may be received by the computer server system 300 from another source (not shown). This another source (not shown) could be external to the computer system 300, i.e. it may be located remotely from the computer server system 300.

A media streaming logic 330 may be used to retrieve or otherwise access the media content 331 in response to requests from electronic devices 200 or other systems, and populate the media stream service with streams 322, 324, 326 of corresponding media content data 323, 325, 327 that may be returned, i.e. streamed, to the requesting electronic device 200.

The electronic device 200 comprises a user interface 230, which may advantageously be adapted to display or otherwise provide a visual array of media options 232, for example as a two-dimensional grid, a list, or other visual format, and determine a user input from user 500. Each media option in the visual array of media options 232 correspond to a respective media stream 322, 324, 326.

Selecting a particular media option within the visual array 232 may be used, or otherwise interpreted, as a request or instruction to the media server application 312 to stream or otherwise return a corresponding particular media content item. For example, in accordance with some embodiments, the software application 310 at the computer server system 300 may be used to stream or otherwise communicate media content to the electronic device 200, wherein the user interface 230 at the electronic device 200 is adapted to display a plurality of media options that correspond to respective media streams.

In accordance with some embodiments, the electronic device 200 may also include a media playback application 220, together with a playback logic 222, pre-buffering logic 145, and a volume function 145, which may be used to control the playback of media content that is received from the media server application 312, for playback by the electronic device 200, as described in further detail below.

As will be appreciated, the user 500 may interact 11 with the user interface 230 of the electronic device 200 and issue requests (or request messages), for example the playing of a selected media option at the electronic device 200. The user's selection of a particular media option may be communicated 12 to the media server application 312, via the media application interface 314. The media server application 312 may then be instructed 13 to stream corresponding media content, including one or more streams of media content data 323, 325, 327, and subsequently stream 14 or otherwise communicate the selected media to the user's electronic device 200. In accordance with some embodiments, pre-buffering requests from the electronic device 200 may also be communicated 12 to the media server application 312 via the media application interface 314. At the electronic device 200, in response to the user's interaction with the user interface 230, the media playback application 220, including the playback logic 222, may play 10 the requested, and thus selected, media content to the user 500.

Figure 2:
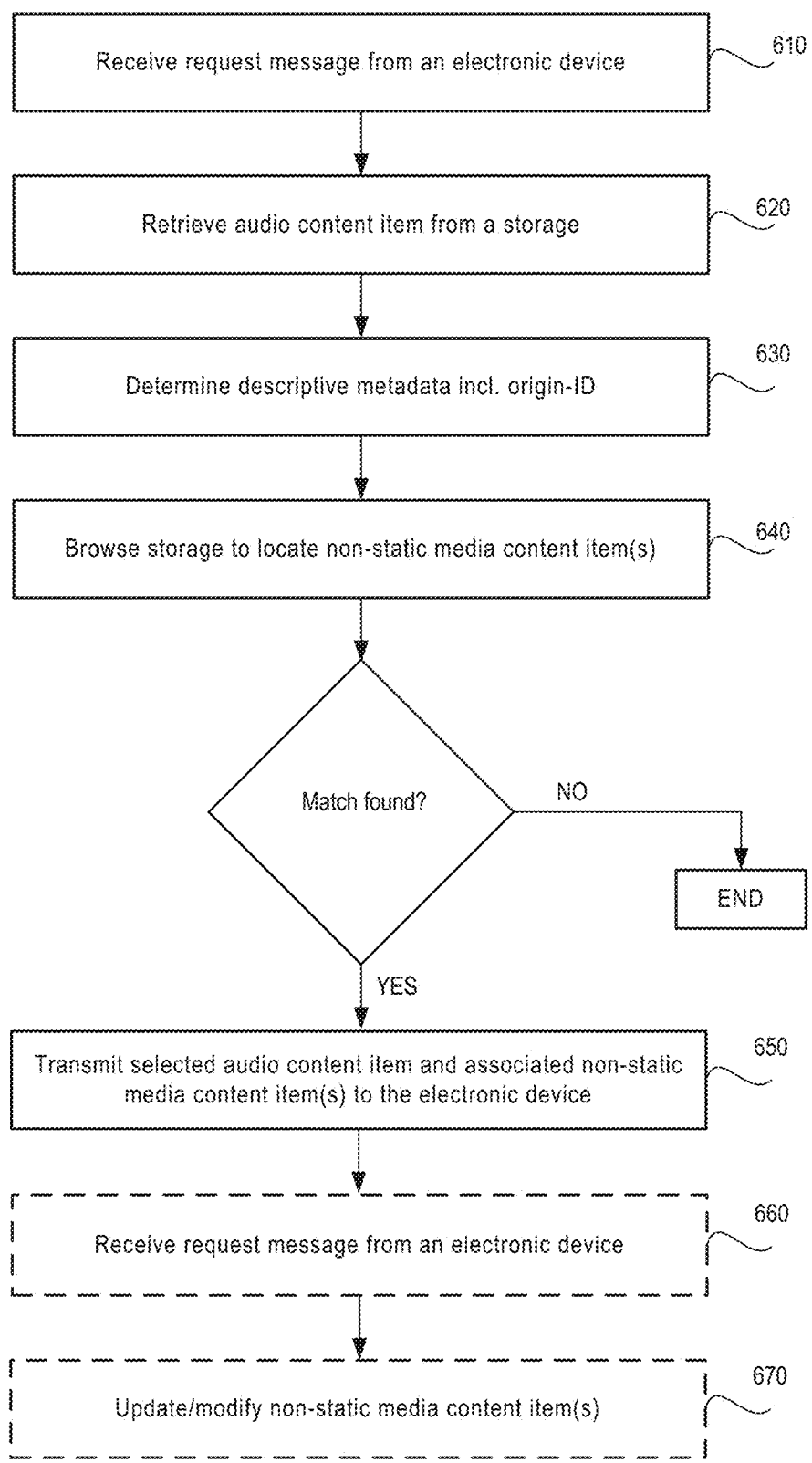
FIG. 2 illustrates a flowchart of a method in accordance with an embodiment.

Reference is now made to FIG. 2, which is a flowchart illustrating a method of streaming an audio content item to an electronic device 200 in accordance with an embodiment. In advantageous embodiments, the method is performed by, or otherwise implemented in, a computer system 300 including one single computer or several computers. The audio content item may be associated with, or otherwise include, audio content for playback by the electronic device 200.

Action 610: A request message (e.g., in the form of a data message) is received 12 from an electronic device 200 (see also FIG. 1). This request message includes, or otherwise indicates, an instruction requesting the computer server system 300 to return a selected audio content item to the electronic device 200.

Action 620: In response to receiving 12 the request message from the electronic device 200, the selected audio content item is retrieved from a first storage 331*a* (e.g., a first memory).

Action 630: Descriptive metadata including an origin identification (ID) associated with said retrieved audio content item is determined. The origin ID may for example include one or several of the following: a track ID, an artist ID, a playlist ID. In some embodiments, determining said metadata includes retrieving, or fetching, the metadata from the selected audio content item that was retrieved in action 620. In alternative embodiments, it is conceivable that the metadata is retrieved from a separate storage or repository (e.g., memory) (not shown) that is specifically designed to store metadata including origin-ID:s associated with audio content items stored in the first storage 331*a*.

Action 640: A second storage 331*b* (e.g., a second memory) is browsed utilizing the earlier-mentioned metadata including the origin ID in order to locate a non-static media content item associated with this origin ID. Advantageously, but not necessarily, the first storage 331*a* is separate and distinct from the second storage 331*b*, as illustrated in FIG. 1. This may contribute to an effective separation of the audio content items and the non-static media content items, respectively. During streaming from the computer server system 300 to the electronic device 200, audio content items and non-static media content items can consequently be retrieved from different storages 331*a*, 331*b*. This may contribute to achieving a user experience with little or no interruptions in the simultaneous playback and presentation of the selected audio content item and its associated non-static media content item at the electronic device 200. Having separate storages 331*a*, 331*b* may be particularly advantageous in scenarios where a non-static media content item comprise a video content item.

Action 650: In response to locating, or otherwise finding, a non-static media content item(s) associated with the origin ID in the second storage 331*b*, the method further comprises transmitting (or, sending) the selected audio content item along with the located non-static media content item to the electronic device 220 for subsequent simultaneous presentation of the audio content item as well as the located non-static media content item by the electronic device 200.

In the event no non-static media content item associated with the origin ID is located (or found) in the second storage 331*b*, the method may end. In advantageous embodiments, the method however proceeds in that the method further comprises transmitting the selected audio content item. That is, the selected audio content item is returned to the electronic device 220 without any accompanying non-static media content item.

As described earlier, in advantageous embodiments the non-static media content item comprises a video content item. The video media content item is thus associated with, or otherwise include, video content. In one embodiment, the video content item may comprise a video canvas content item. In other words, video content may comprise video canvas content. As discussed earlier in this disclosure, canvas content is, generally speaking, content that is configured to incorporate a variety of visual effects to the video content being played.

Additionally, or alternatively, the non-static media content item includes content items including one or more of the following: dynamic text, a dynamic image (e.g., a dynamic picture). As described earlier, the expression 'dynamic' is generally used to mean changing or developing (over time). In other words, dynamic text may include text that undergoes a continuous change during presentation. Likewise, a dynamic image may include an image that undergoes a continuous change during presentation. In some embodiments, the dynamic text and/or the dynamic image additionally includes a canvas content item. In other words, the dynamic text and/or the dynamic image additionally includes canvas content. As mentioned earlier, the canvas content is, generally speaking, content that is configured to incorporate a variety of visual effects to the dynamic text/ dynamic image that is currently being presented.

In some embodiments, it is also possible to update or otherwise modify the non-static media content items stored in the second storage 331*b*. To this end, the method may optionally comprise actions, or method steps, 660 and 670.

Action 660: A request message is received from an electronic device 200. This request message includes, or is otherwise indicative of, an instruction requesting the computer server system 300 to change, or otherwise modify, a non-static media content item associated with a selected origin ID.

Action 670: In response to receiving the request message in action 660, the non-static media content item(s) associated with the selected origin ID is changed or otherwise modified in accordance with the request.

This allows for an increasingly flexible solution for the distribution of media content. For example, users of electronic devices can control the non-static media content items at anytime and anywhere. This, in turn, may enable users such as artists to individually control non-static media content items associated with their music. In other words, this opens up for a completely new way for artists to control the distribution of their own artistic creations. In a sense, this will also contribute to artist being able to connect more easily to their respective fans.

As will be appreciated, actions 660 and 670 can be performed independently of the preceding actions 610-650.

In some embodiments, the computer server system 300 may be configured to validate the electronic device 200 associated with the user 500 that is transmitting the request message in action 660 prior to performing the requested change. For example, in response to receiving the request message in action 660, the computer server system 300 may optionally return (i.e., transmit) a prompt message to the electronic device 200 that transmitted the request message. The prompt message includes information that, when presented (e.g., displayed at user interface 230 of the electronic device 200) prompts the user 500 to provide its credentials (e.g., an artist ID). In response to the computer server system 300 receiving a data message including said credentials from the electronic device 200, the computer server system can be configured to browse a storage (not shown) to check that the user 500 that transmitted said request message exists among stored users that are allowed to change non-static image content item(s). If or when the computer server system locates a match between the received credentials and a stored user that is allowed to change non-static image content item(s), it may thus be possible for the computer server system 300 to validate the electronic device 200 that transmitted the request message for changing the non-static media content item(s). In response to this validation, the computer server system 300 may then also proceed by performing, or otherwise executing, the requested change of the non-static media content item(s).

Figure 3:
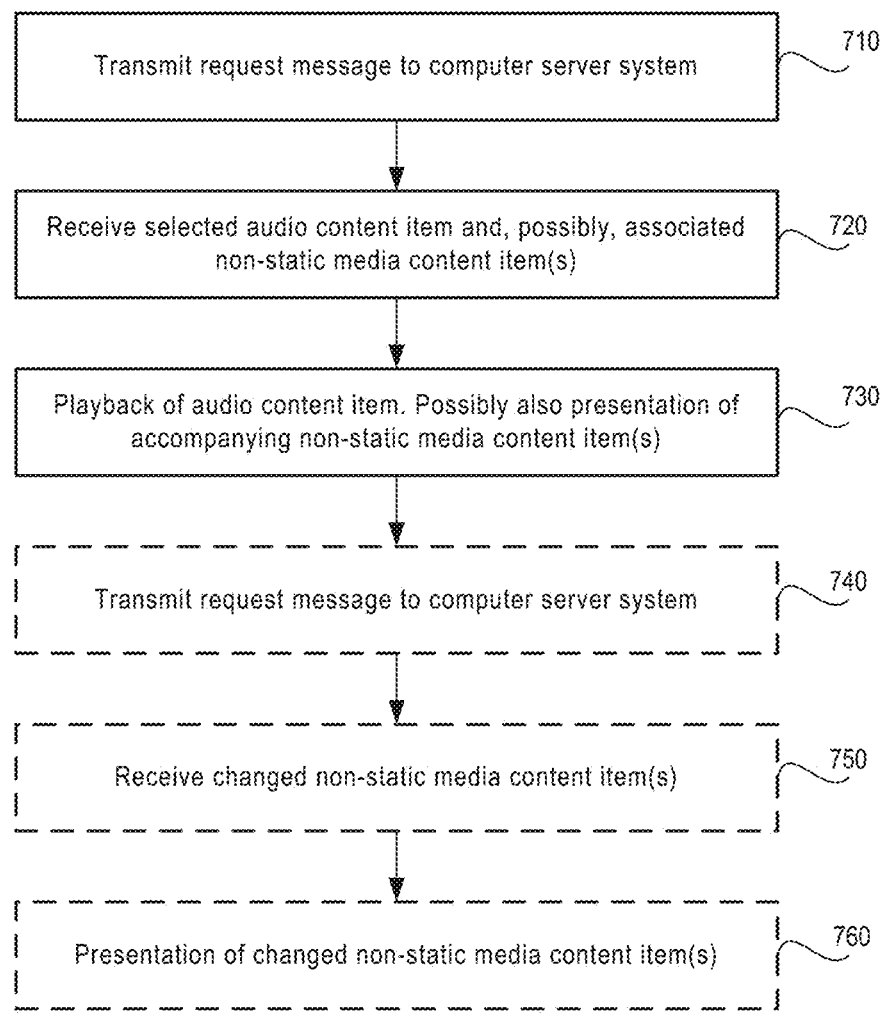
FIG. 3 illustrates a flowchart of a method in accordance with an embodiment.

Reference is now made to FIG. 3, which is a flowchart illustrating a method of streaming an audio content item to an electronic device 200. The method is advantageously performed by or otherwise implemented in an electronic device 200.

Action 710: A request message (e.g., in the form of a data message) is transmitted, or sent, to the computer server system 300 (see FIG. 1). This request message includes, or otherwise indicates, an instruction requesting the computer server system 300 to return a selected audio content item to the electronic device 200.

Action 720: The selected audio content item is subsequently received from the computer server system 300. In the event the computer server system 300 has located a non-static media content item(s) associated with the selected audio content item, the selected audio content item is received along with the thus located non-static media content item(s) from the computer server system 300. Else, i.e. if the computer server system 300 has not located a non-static media content item(s) associated with the selected audio content item, only the selected audio content item is received. That is, the selected audio content item is received without any accompanying non-static media content item.

Action 730: The received audio content item is played. If or when an accompanying non-static media content item(s) is also received, this/these non-static media content item(s) is/are presented simultaneously as the received audio content item is being played.

In some embodiments, it is also possible to update or otherwise modify the non-static media content items stored in the second storage 331*b*.

Action 740: A request message is transmitted to the computer server system 300. This request message includes, or is otherwise indicative of, an instruction requesting the computer server system 300 to change, or otherwise modify, a non-static media content item associated with a selected origin ID.

As will be appreciated, the selected origin ID may be selected by a user who operates and interacts with the user interface 230 of the electronic device 200 in order to make or indicate his or her selection of the origin ID (e.g., track ID, artist ID and/or playlist ID) whose associated non-static media content item(s) is to be changed. Selecting a particular origin ID and possible related change options for the selected origin ID when operating and interacting with the user interface 230 may hence be used, or otherwise interpreted, as a request or instruction to the media server application 312 to change or otherwise modify non-static media content item(s) associated with the selected origin ID that is/are stored in the second storage 331*b* in accordance with these user-prompted instructions.

Action 750: Subsequent to computer server system 300 having changed a non-static media content item(s) associated with the selected origin ID, an earlier-selected audio content item may be received along with the thus changed non-static media content item(s) from the computer server system 300.

Action 760: If or when a changed non-static media content item(s) is also received, this/these non-static media content item(s) may be presented simultaneously as the received audio content item is being played.

This allows for an increasingly flexible solution for the distribution of media content. For example, users of electronic devices can control the non-static media content items at anytime and anywhere. This, in turn, may enable artists to individually control non-static media content items associated with their music. In other words, this opens up for a completely new way for artists to control the distribution of their own artistic creations. In a sense, this will also contribute to artist being able to connect more easily to their respective fans.

As will be appreciated, actions 740, 750 and 760 can be performed independently of the preceding actions 710-730.

Figure 4A:
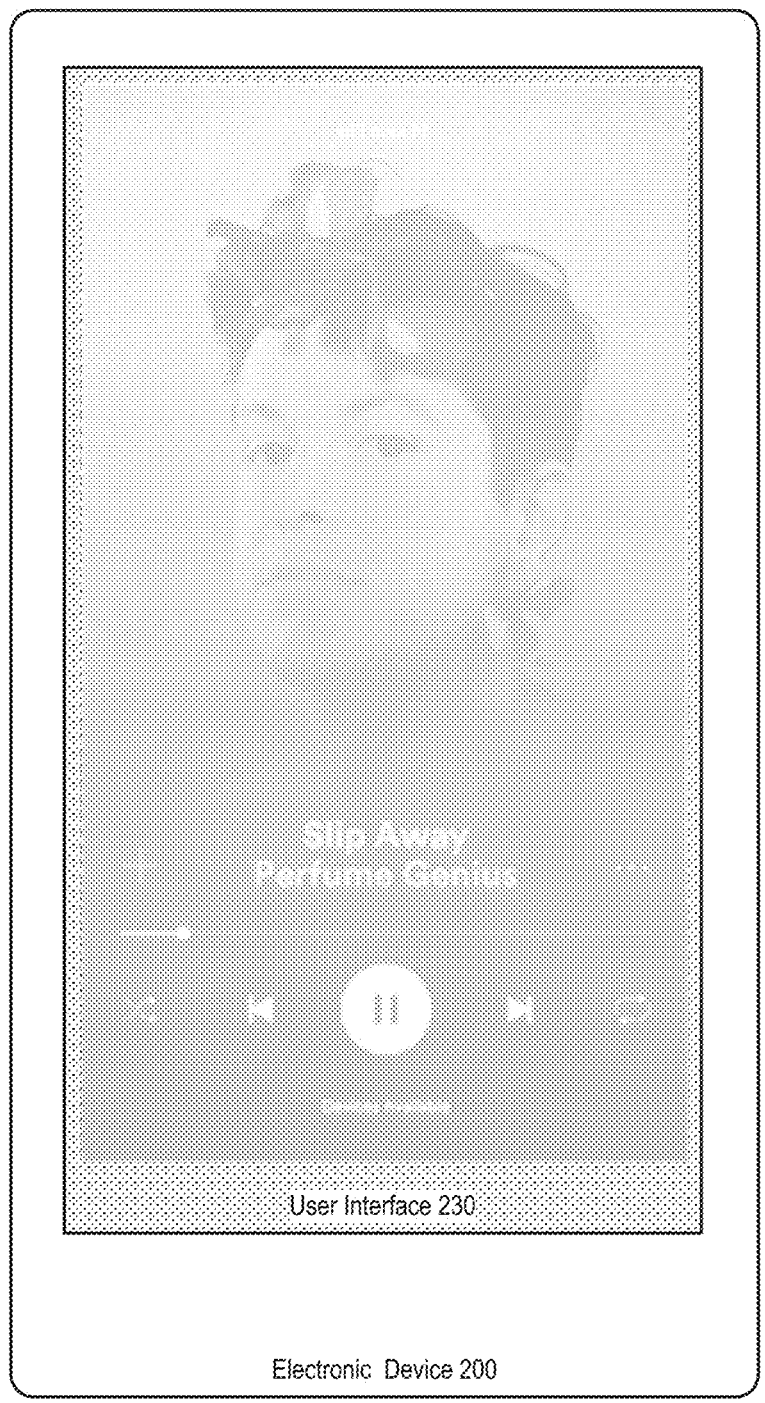
FIGS. 4A-4C illustrate a series of visual appearances/views of a user interface of an electronic device at different times, t0, t1 and t2, respectively.
Figure 4B:
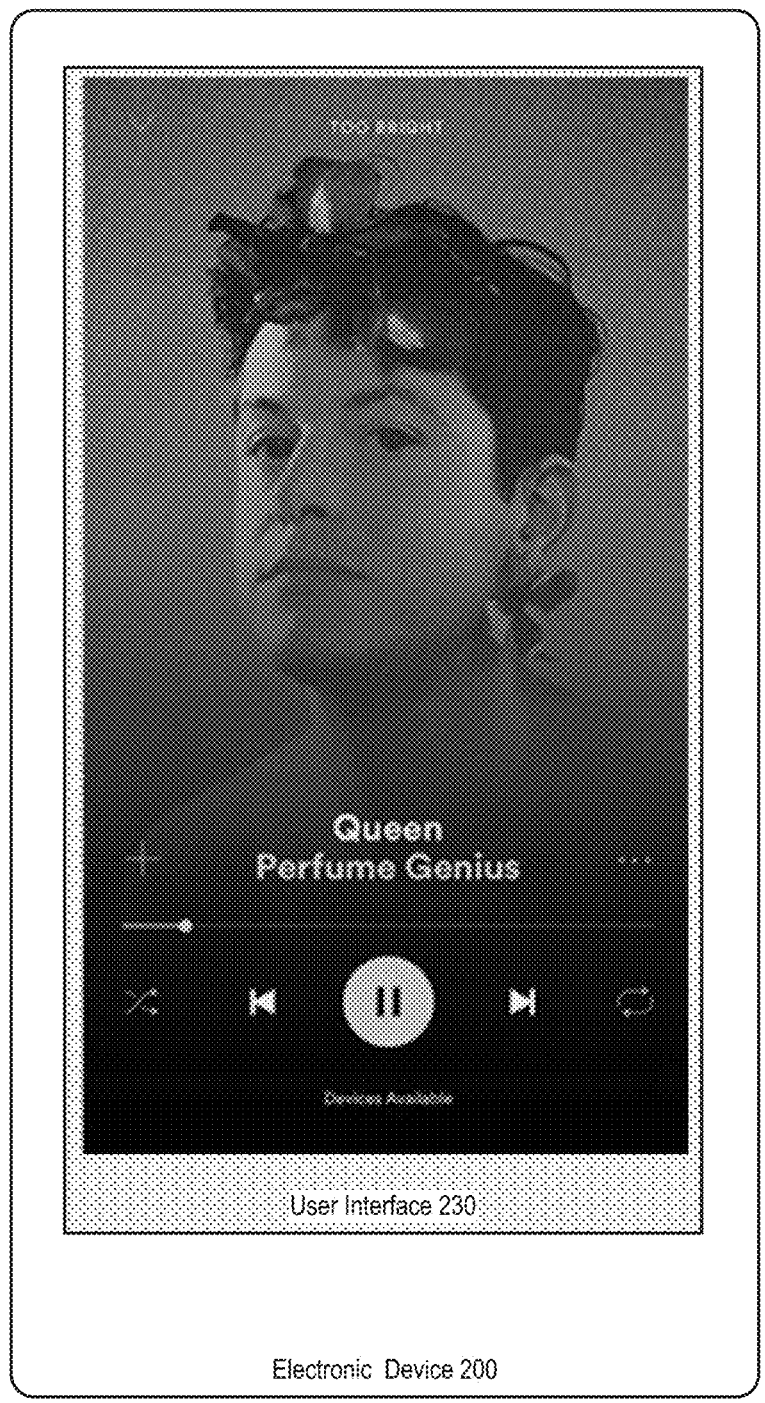
Figure 4C:
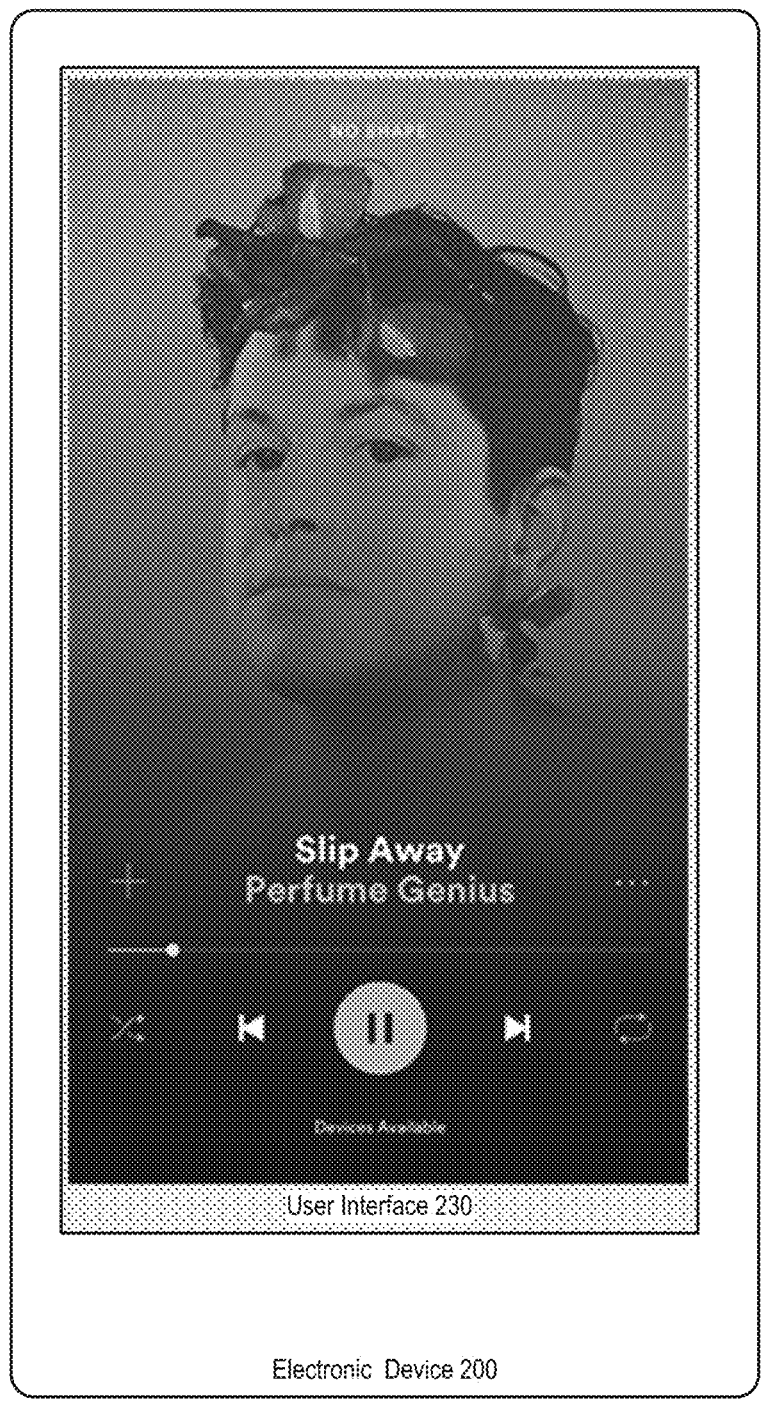

Reference is now made to FIGS. 4A-4C, which schematically illustrate how a non-static media content item can be changed or shifted over time in accordance with an embodiment. In the example embodiment of FIGS. 4A-4C, the non-static media content item is in the form of dynamic image content item (e.g., including a cover art) associated with the currently played audio content item (e.g., a song). For example, FIG. 4A may be a view at time t0. FIG. 4B may be a view at time t1, where t1>t0. FIG. 4C may be a view at time t2, where t2>t1. As will be appreciated, the non-static media content item can change, or develop, during the playback of the audio content item. In contrast to the existing prior art where one single image (typically a rectangular cover art) is typically presented throughout the playback of an entire song, this embodiment allows for a visual appearance of the presented image content to change, develop or shift, during the duration of a played song. In other words, during portions of or during the entire playback of e.g. a song the visual appearance of the presented image content associated with the played song can change or develop. The provision of non-permanent visual appearance of e.g. a cover art associated with a particular song contributes to a novel user experience when consuming, e.g., streamed audio content at the electronic device 200.

In other embodiments, the non-static media content item comprises a video content item. Accompanying a played audio content item by simultaneously presenting (i.e., playing) video content associated with a received video content item provides for an increasingly dynamic user experience (e.g., compared with the existing prior art). When the non-static media content item is provided as a video content item, it is particularly advantageous to store audio content items and non-static media content items in separate storages 331a, 331b (see FIG. 1). During streaming from the computer server system 300 to the electronic device 200, audio content items and non-static media content items are consequently retrieved from different storages 331a and 331b, respectively. For example, it is possible to pre-fetch segments of a video content item at the electronic device 200, e.g. utilizing the pre-buffering logic 145 (see FIG. 1). Having separate storages facilitates simultaneous transmission of the audio content at the one hand and the video content item on the other hand, since the video content item can be segmented more easily at the computer server system 300 and, hence, the electronic device 200 will be capable of pre-fetching, or otherwise pre-buffering, the video content item in an efficient manner during the streaming. At the electronic device 200, this allows for a user experience with no or little interruptions during the simultaneous playback/presentation of a selected audio content item and its associated video content item.

Figure 5:
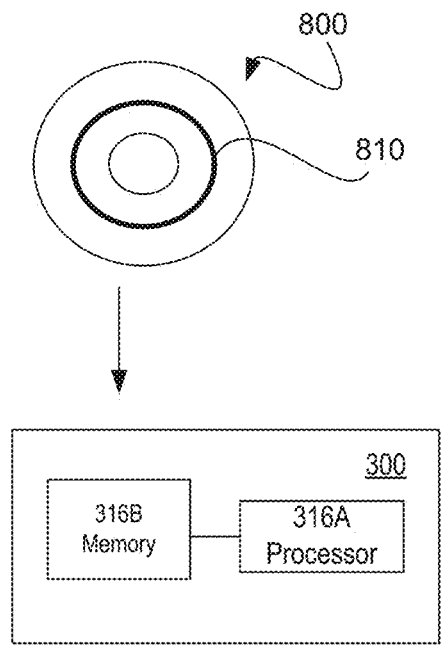
FIG. 5 illustrates a carrier containing a computer program, in accordance with an embodiment.

Turning now to FIG. 5, another aspect will be briefly discussed. FIG. 5 shows an example of a computer-readable medium, in this example in the form of a data disc 800. In one embodiment, the data disc 800 is a magnetic data storage disc. The data disc 800 is configured to carry instructions 810 that can be loaded into a data storage (e.g., memory) of an apparatus 300. Upon execution of said instructions by a processor 316A of the apparatus 300, the apparatus 300 is caused to execute a method or procedure according to the any one of the embodiments described in conjunction with FIG. 2. The data disc 800 is arranged to be connected to or within and read by a reading device (not shown), for loading the instructions into the processor. One such example of a reading device in combination with one (or several) data disc(s) 800 is a hard drive. It should be noted that the computer-readable medium can also be other mediums such as compact discs, digital video discs, flash memories or other memory technologies commonly used. In such an embodiment, the data disc 800 is one type of a tangible computer-readable medium. The instructions may alternatively be downloaded to a computer data reading device, such as a computer or other electronic device capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 6:
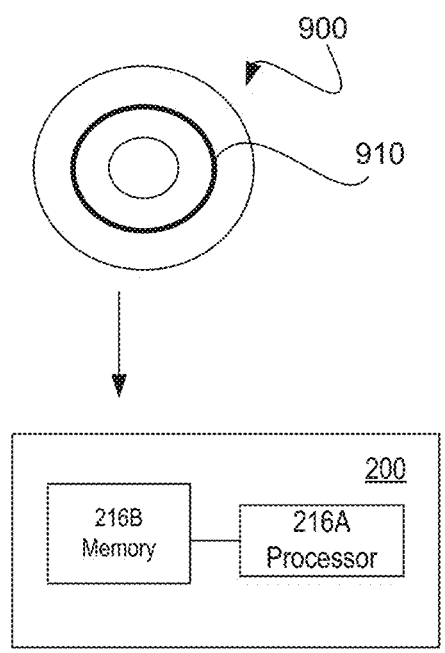
FIG. 6 illustrates a carrier containing a computer program, in accordance with another embodiment.

Turning now to FIG. 6, another aspect will be briefly discussed. FIG. 6 shows an example of a computer-readable medium, in this example in the form of a data disc 900. In one embodiment, the data disc 900 is a magnetic data storage disc. The data disc 900 is configured to carry instructions 910 that can be loaded into a data storage (e.g., memory) of an apparatus 200. Upon execution of said instructions by a processor 216A of the apparatus, the apparatus 200 is caused to execute a method or procedure according to the any one of the embodiments described in conjunction with FIG. 3. The data disc 900 is arranged to be connected to or within and read by a reading device (not shown), for loading the instructions into the processor. One such example of a reading device in combination with one (or several) data disc(s) 900 is a hard drive. It should be noted that the computer-readable medium can also be other mediums such as compact discs, digital video discs, flash memories or other memory technologies commonly used. In such an embodiment, the data disc 900 is one type of a tangible computer-readable medium. The instructions may alternatively be downloaded to a computer data reading device, such as a computer or other electronic device capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 7:
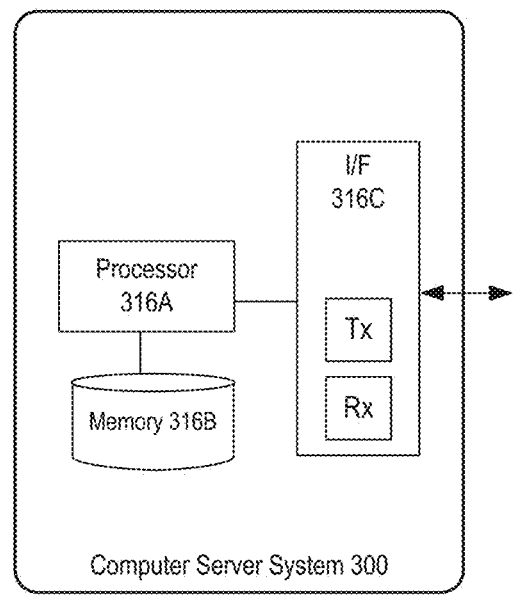
FIG. 7 illustrates an example implementation of an embodiment of a computer server system in FIG. 1.

With reference to FIG. 7, an example implementation of the computer server system 300 of FIG. 1 will be described in some further detail. For example, the computer server system 300 shown in FIG. 1 may comprise one or several computer servers, as described earlier. In some embodiments, the computer server system 300 may comprise means adapted to perform the method described herein with reference to FIG. 2. In one embodiment, the computer server system 300 may comprise means 316C adapted to receive a request message from an electronic device, said request message including an instruction requesting the computer server system 300 to return a selected audio content item to the electronic device; means 316A adapted to retrieve said selected audio content item from a first storage in response to receiving said request message; and means 316A adapted to determine descriptive metadata including an origin identification (ID) associated with said retrieved audio content item. Furthermore, the computer server system 300 may comprise means 316A adapted to browse a second storage, utilizing said metadata including the origin ID, to locate a non-static media content item associated with the origin ID. Still further, the computer server system may comprise means 316C adapted to transmit the selected audio content item along with the located non-static media content item to the electronic device for subsequent simultaneous presentation of the audio content item as well as the located non-static media content item by the electronic device—in response to finding non-static media content item associated with the origin ID.

More specifically, FIG. 7 schematically illustrates one example implementation of a computer server system 300, here exemplified by a single computer server in order to ease the understanding of the disclosure. The computer server 300 shown in FIG. 7 is configured to execute, or otherwise perform, the methods described throughout this disclosure with reference to FIG. 2. As is schematically illustrated in FIG. 7, the computer server 300 comprises hardware 316. For example, the computer server 300 may comprise one or more processors 316A and one or more memories 316B. Also, a communications interface 316C, or a communications circuitry, may be provided in order to allow the computer server 300 to communicate with electronic devices 200 and/or other servers 300, e.g. via a network 400 such as the Internet. To this end, the communications interface 316C may comprise a transmitter (Tx) and a receiver (Rx). Alternatively, the communications interface 316C may comprise a transceiver (Tx/Rx) combining both transmission and reception capabilities. The communications interface 316C may include a radio frequency (RF) interface allowing the computer server 300 to communicate with electronic devices 200 and/or other computer servers 300 through a radio frequency band through the use of different radio frequency technologies such as 5G New Radio, LTE (Long Term Evolution), WCDMA (Wideband Code Division Multiple Access), or any other cellular network standardized by the 3rd Generation Partnership Project (3GPP), or any other wireless technology such as Wi-Fi, Bluetooth®, etcetera. As described with reference to FIG. 1, the computer server 300 may also comprise one or more applications, e.g. the software application 310 including the media server application 312. The applications are sets of instructions (e.g., computer program code) that when executed by the one or more processors 316A controls the operation of the computer server 300.

In some implementations, the one or more memories 316B stores computer program code, which, when run in the one or more processors 316A causes the computer server system 300 to: i) receive a request message from an electronic device via the at least one communications interface, said request message including an instruction requesting the computer server system to return a selected audio content item to the electronic device; ii) in response to receiving said request message, retrieve said selected audio content item from a first storage; and ii) determine descriptive metadata including an origin ID associated with said retrieved audio content item; iv) browse a second storage, utilizing said metadata including the origin ID, to locate a non-static media content item associated with the origin ID; v) and in response to finding non-static media content item associated with the origin ID further: transmit, via the at least one communications interface, the selected audio content item along with the located non-static media content item to the electronic device for subsequent simultaneous presentation of the audio content item as well as the located non-static media content item by the electronic device.

As described earlier, the above-mentioned origin ID may include one or more of the following: a track ID, an artist ID, and a playlist ID.

As described earlier, in advantageous embodiments the non-static media content item comprises a video content item. The video media content item is thus associated with, or otherwise include, video content. In one embodiment, the video content item may comprise a video canvas content item. In other words, video content may comprise video canvas content. Canvas content has been described earlier in this disclosure and will therefore not be repeated here.

Additionally, or alternatively, the non-static media content item includes content items including one or more of the following: text, an image (e.g., a picture). Additionally, or alternatively, the one or more memories 316B stores computer program code, which, when run in the one or more processors 316A causes the computer server system 300 to i) receive, via the at least one communications interface, a request message from an electronic device, said request message including an instruction requesting the computer server system to change, or otherwise modify, a non-static media content item associated with a selected origin ID; and ii) in response thereto change, or otherwise modify, the non-static media content item associated with the selected origin ID accordingly.

Figure 8:
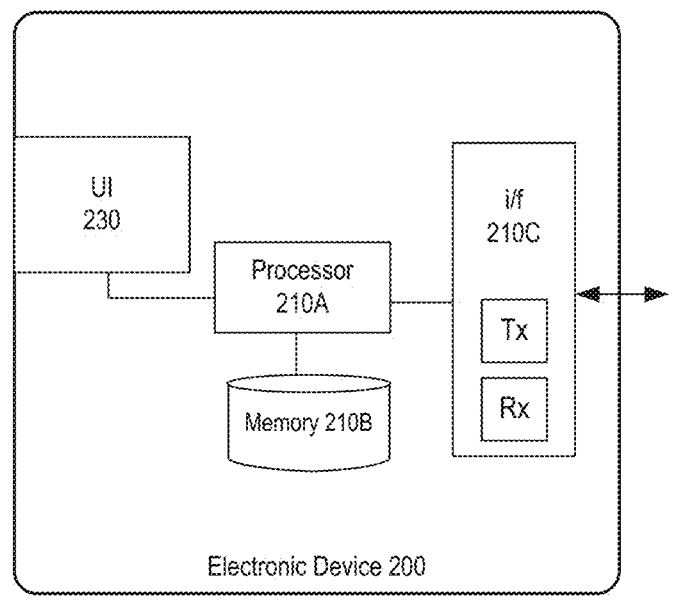
FIG. 8 illustrates an example implementation of an embodiment of an electronic device in FIG. 1.

With reference to FIG. 8, an example implementation of the electronic device 200 of FIG. 1 will be described in some further detail. In some embodiments, the electronic device 200 may comprise means adapted to perform the method described with reference to FIG. 3. In one embodiment, the electronic device 200 comprises means 210C adapted to transmit a request message to the computer server system, said request message including an instruction requesting the computer server system to return a selected audio content item to the electronic device 200; and means 210C adapted to receive the selected audio content item along with a located non-static media content from the computer server system. The electronic device 200 also comprises means 230 adapted to play the selected the audio content item and, at the same time, present the located non-static media content.

Additionally, or alternatively, the electronic device 200 may comprise means 210C adapted to transmit a request message computer server system 300, wherein this request message includes, or is otherwise indicative of, an instruction requesting the computer server system 300 to change, or otherwise modify, a non-static media content item associated with a selected origin ID.

As mentioned earlier, the selected origin ID may be selected by a user who operates and interacts with the user interface 230 of the electronic device 200 in order to make or indicate his or her selection of the origin ID (e.g., track ID, artist ID and/or playlist ID) whose associated non-static media content item(s) is to be changed. Selecting a particular origin ID and possible related change options for the selected origin ID when operating and interacting with the user interface 230 may hence be used, or otherwise interpreted, as a request or instruction to computer server system 300 to change or otherwise modifying non-static media content item(s) associated with the selected origin ID in accordance with these user-prompted instructions.

FIG. 8 illustrates an example implementation of the electronic device 200. Again, the electronic device mobile may be a mobile communication device (e.g., a cellular telephone, a smartphone, a tablet computer, or the like). The electronic device 200 is configured to execute, or otherwise perform, the method described with respect to FIG. 3. As is schematically illustrated in FIG. 8, the electronic device 200 comprises hardware 210A-C. For example, the electronic device 200 may comprise one or more processors 210A and one or more memories 210B. Also, a communications interface 210C may be provided in order to allow the electronic device 200 to communicate with other electronic devices and/or servers 300, e.g. via a network 400 such as the Internet. To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the electronic device 200 to communicate with other devices and/or servers 300 through a radio frequency band through the use of different radio frequency technologies such as 5G New Radio, LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. The electronic device 200 may further comprise a user interface 230, as described earlier herein. Hence, the user interface 230 may advantageously include a touch-sensitive display. As such, the touch-sensitive display may be a touch screen display upon which virtual keys may be displayed and operated. Furthermore, the user interface 230 may include output means such as loudspeakers (not shown). As described with reference to FIG. 1, the electronic device 200 may comprise one or more applications, e.g. the media playback application 220. The applications may include sets of instructions (e.g., computer program code) that when executed by the one or more processors 210A controls the operation of the electronic device 200.

In some implementations, the one or more memories 210B stores computer program code, which, when run in the one or more processors 210A causes the electronic device 200 to transmit, via the communications interface 210C, a request message to a computer server system, said request message including an instruction requesting the computer server system to return a selected audio content item to the electronic device; and receive, via the communications interface 210C, the selected audio content item along with a located non-static media content from the computer server system; and in response thereto simultaneously present of the audio content item as well as the located non-static media content by means of the user interface 230.

Additionally, or alternatively, the one or more memories 210B may store computer program code, which, when run in the one or more processors 210A causes the electronic device 200 to transmit a request message computer server system 300, wherein this request message includes, or is otherwise indicative of, an instruction requesting the computer server system 300 to change, or otherwise modify, a non-static media content item associated with a selected origin ID.

Various aspects and embodiments described throughout this disclosure allow for a novel user experience when consuming streamed media content at an electronic device 200. For example, aspects and embodiments described herein provide a novel user experience during the consumption of streamed audio content at an electronic device 200, e.g. during playback of songs of a music playlist.

For example, certain aspects and embodiments described herein allow for presenting a non-static media content item during the playback of a currently played song—thus essentially replacing the static cover arts that have been and still are commonly used in the existing art. This contributes to achieving a novel and different user experience when playing songs of a music playlist at an electronic device.

Various aspects and embodiments described herein are based on the notion that the audio content items and the non-static media items are separate and distinct from each other. This provides for a flexible solution. Whereas in the existing art an audio content item e.g. in the form of a music content item (e.g., a music file) is typically linked or coupled to pre-defined static image content (e.g., a rectangular cover art associated with a music album), the separation between the audio content item and the non-static media content item allows for a more flexible solution where a certain audio content item may be associated with several different non-static media content items.

In advantageous embodiments, the first storage and the second storage are separate storages. This may allow for an increasingly effective separation of the audio content items and the non-static media content items, respectively. During streaming from the computer server system to the electronic device, audio content items and non-static media content items can consequently be retrieved from different storages. This contributes to achieving a user experience with little or no interruptions in the simultaneous playback and presentation of the selected audio content item and its associated non-static media content item. Having separate storages may be particularly advantageous in scenarios where a non-static media content item comprise a video content item.

In some embodiments, the non-static media content comprises a video content item. At the electronic device, it is possible to pre-fetch segments of a video content item. Having separate storages facilitates simultaneous transmission of the audio content at the one hand and the video content item on the other hand, since the video content item can be segmented more easily and, hence, the electronic device will be capable of pre-fetching the video content item during the streaming. At the electronic device, this allows for a user experience with no or little interruptions during the simultaneous playback/presentation of a selected audio content item and its associated video content item.

In some embodiments, it is made possible to change, or otherwise modify, a non-static media content item associated with a selected origin ID. This allows for an increasingly flexible solution for the distribution of media content. For example, users of electronic devices can individually control the non-static media content items at anytime and anywhere. This, in turn, may enable users such as artists to individually control non-static media content items associated with their music. In other words, this opens up for a completely new way for artists to control the distribution of their own artistic creations. In a sense, this will also contribute to artist being able to connect more easily to their respective fans.

In this regard, it is also an advantage that the accompanying content items are non-static. The non-static media content could be provided in the form on non-permanent text content, image content, video content, live video content, etcetera. This may have the further advantage of giving the artist more options of distributing his or her artistic creations. In other words, a flexible solution can be provided.

In the detailed description hereinabove, for purposes of explanation and not limitation, specific details are set forth in order to provide a thorough understanding of various aspects and embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate)

state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method of streaming an audio content item to an electronic device, the method being performed by a computer server system comprising one or several computers, and the method comprising:
   receiving a request message from an electronic device, said request message including an instruction requesting the computer server system to return a selected audio content item to the electronic device;
   in response to receiving said request message, before transmitting the selected audio content item to the electronic device:
      retrieving said selected audio content item from a first storage;
      determining descriptive metadata including an origin identification (ID), associated with said retrieved audio content item; and
      browsing a second storage, utilizing said descriptive metadata including the origin ID, to locate a non-static media content item associated with the origin ID;
   in response to locating, in the second storage, the non-static media content item associated with the origin ID, transmitting to the electronic device:
      the selected audio content item, and
      the located non-static media content item,
      wherein the audio content item and the located non-static media content item are subsequently presented simultaneously by the electronic device;
   in response to not locating, in the second storage, the non-static media content item associated with the origin ID, transmitting to the electronic device, the selected audio content item;
   receiving another request message from the electronic device, said other request message including an instruction requesting the computer server system to modify the non-static media content item associated with a selected origin ID; and
   in response to the other request message, modifying the non-static media content item associated with the selected origin ID accordingly.

2. The method according to claim 1, wherein the origin ID includes one or more of the following: a track ID, an artist ID, a playlist ID.

3. The method according to claim 1, wherein the non-static media content item comprises a video content item.

4. The method according to claim 3, wherein the video content item comprises a video canvas content item.

5. The method according to claim 1, wherein the first storage is separate and distinct from the second storage.

6. A computer server system for streaming an audio content item to an electronic device, the computer server system comprising:
   at least one communications interface for transmission and reception of messages;
   at least one processor; and
   memory comprising instructions executable by the at least one processor whereby the computer server system is operative to:
      receive a request message from an electronic device via the at least one communications interface, said request message including an instruction requesting the computer server system to return a selected audio content item to the electronic device;
      in response to receiving said request message, before transmitting the selected audio content item to the electronic device:
         retrieve said selected audio content item from a first storage;
         determine descriptive metadata including an origin identification (ID), associated with said retrieved audio content item; and
         browse a second storage, utilizing said descriptive metadata including the origin ID, to locate a non-static media content item associated with the origin ID;
      in response to locating, in the second storage, the non-static media content item associated with the origin ID, transmit, via the at least one communications interface:
         the selected audio content item, and
         the located non-static media content item,
         wherein the audio content item and the located non-static media content item are subsequently presented simultaneously by the electronic device;
      in response to not locating, in the second storage, the non-static media content item associated with the origin ID, transmit to the electronic device, the selected audio content item;
      receive, via the at least one communications interface, another request message from the electronic device, said other request message including an instruction requesting the computer server system to modify the non-static media content item associated with a selected origin ID; and
      in response to the other request message, modify the non-static media content item associated with the selected origin ID accordingly.

7. The computer server system according to claim 6, wherein the origin ID includes one or more of the following: a track ID, an artist ID, a playlist ID.

8. The computer server system according to claim 6, wherein the non-static media content item comprises a video content item.

9. The computer server system according to claim 8, wherein the video content item comprises a video canvas content item.

10. The computer server system according to claim 6, wherein the first storage is separate and distinct from the second storage.

11. A non-transitory computer readable medium comprising instructions which, when executed on a computer server system with at least one processor, cause the at least one processor to:

receive a request message from an electronic device via at least one communications interface, said request message including an instruction requesting the computer server system to return a selected audio content item to the electronic device;

in response to receiving said request message, before transmitting the selected audio content item to the electronic device:

retrieve said selected audio content item from a first storage;

determine descriptive metadata including an origin identification (ID), associated with said retrieved audio content item; and browse a second storage, utilizing said descriptive metadata including the origin ID, to locate a non-static media content item associated with the origin ID;

in response to locating, in the second storage, the non-static media content item associated with the origin ID, transmit, via the at least one communications interface:
the selected audio content item, and
the located non-static media content item,
wherein the audio content item and the located non-static media content item are subsequently presented simultaneously by the electronic device;

in response to not locating, in the second storage, the non-static media content item associated with the origin ID, transmit to the electronic device, the selected audio content item;

receive, via the at least one communications interface, another request message from the electronic device, said other request message including an instruction requesting the computer server system to modify the non-static media content item associated with a selected origin ID; and in response to the other request message, modify the non-static media content item associated with the selected origin ID accordingly.

12. The method according to claim 1, wherein transmitting to the electronic device the selected audio content item, and the located non-static media content item includes:
segmenting the located non-static media content item; and
transmitting one or more segments of the located non-static media content item.

* * * * *